(12) United States Patent
Haraguchi et al.

(10) Patent No.: US 9,518,480 B2
(45) Date of Patent: Dec. 13, 2016

(54) EXHAUST HEAT RECOVERY DEVICE

(71) Applicant: SANDEN CORPORATION, Isesaki-shi (JP)

(72) Inventors: Tomonori Haraguchi, Isesaki (JP); Hirofumi Wada, Isesaki (JP)

(73) Assignee: SANDEN HOLDINGS CORPORATION, Isesaki-shi (JP)

( * ) Notice: Subject to any disclaimer, the term of this patent is extended or adjusted under 35 U.S.C. 154(b) by 57 days.

(21) Appl. No.: 14/400,295

(22) PCT Filed: May 2, 2013

(86) PCT No.: PCT/JP2013/062787
§ 371 (c)(1),
(2) Date: Nov. 10, 2014

(87) PCT Pub. No.: WO2013/168683
PCT Pub. Date: Nov. 14, 2013

(65) Prior Publication Data
US 2015/0107253 A1    Apr. 23, 2015

(30) Foreign Application Priority Data
May 9, 2012    (JP) ................................. 2012-107317

(51) Int. Cl.
*F01K 13/02*    (2006.01)
*F01K 23/10*    (2006.01)
(Continued)

(52) U.S. Cl.
CPC ................. *F01K 13/02* (2013.01); *F01K 7/30* (2013.01); *F01K 23/065* (2013.01); *F01K 23/10* (2013.01);
(Continued)

(58) Field of Classification Search
CPC .......... F01K 13/02; F01K 7/30; F01K 23/065; F01K 23/10; F01K 27/02; F02G 5/00; F02G 2260/00; Y02T 10/166
See application file for complete search history.

(56) References Cited

U.S. PATENT DOCUMENTS

2009/0071156 A1    3/2009    Nishikawa et al.
2012/0151948 A1    6/2012    Ogata et al.

FOREIGN PATENT DOCUMENTS

CN    101387241    3/2009
JP    09-170407    6/1997
(Continued)

*Primary Examiner* — Audrey K Bradley
(74) *Attorney, Agent, or Firm* — Cozen O'Connor

(57) ABSTRACT

An exhaust heat recovery device 1, with a Rankine cycle for recovering and using exhaust heat of an engine 10 includes: a Rankine cycle 2 including a heater 22, an expander 23, a condenser 24, and a pump 25; a bypass flow passage 26 allowing the refrigerant to circulate while bypassing the expander 23; a bypass valve 27 opening and closing the bypass flow passage 26; and a control unit 4. When starting up the Rankine cycle 2, the control unit 4 executes start-up control of the Rankine cycle 2 in which the pump 25 is actuated with the bypass valve 27 open and then the bypass valve 27 is closed. Furthermore, the control unit 4 repeatedly executes the start-up control when the pressure difference between the high-pressure side and the low-pressure side of the Rankine cycle 2 after closing the bypass valve 27 does not reach the start-up completion determination value within a predetermined time.

11 Claims, 6 Drawing Sheets

(51) Int. Cl.
*F01K 27/02* (2006.01)
*F01K 23/08* (2006.01)
*F02G 5/00* (2006.01)
*F01K 23/06* (2006.01)
*F01K 7/30* (2006.01)

(52) U.S. Cl.
CPC ............... *F01K 27/02* (2013.01); *F02G 5/00* (2013.01); *F02G 2260/00* (2013.01); *Y02T 10/166* (2013.01)

(56) References Cited

FOREIGN PATENT DOCUMENTS

| | | |
|---|---|---|
| JP | 2001-116371 | 4/2001 |
| JP | 2009-97387 | 5/2009 |
| JP | 2010-150926 | 7/2010 |
| WO | WO 2011/161952 | 12/2011 |

EXHAUST HEAT RECOVERY DEVICE

RELATED APPLICATIONS

This is a U.S. National Phase Application under 35 USC 371 of International Application PCT/JP2013/062787 filed on May 2, 2013.

This application claims the priority of Japanese application no. 2012-107317 filed May 9, 2012, the entire content of which is hereby incorporated by reference.

TECHNICAL FIELD

The present invention relates to an exhaust heat recovery device provided with a Rankine cycle that recovers exhaust heat of an external heat source such as an engine and regenerates the exhaust heat as power.

BACKGROUND ART

As this type of device, for example, a waste-heat reusing device disclosed in Patent Document 1 has been known. The waste-heat reusing device disclosed in Patent Document 1 has: a Rankine cycle which is equipped with a pump, a heater, an expander, and a condenser; a bypass flow passage which bypasses the expander; and a bypass valve that opens and closes the bypass flow passage. When starting up the Rankine cycle, refrigerant is first circulated with the bypass valve open, and when a temperature of gaseous-phase refrigerant on the inlet side of the expander becomes a predetermined temperature or higher, the bypass valve is closed, and operating rotational speeds of the expander and the pump are made to increase. Moreover, after closing the bypass valve, when the pressure difference (expander pressure difference) between the inlet and the outlet of the expander becomes a predetermined pressure difference, the start-up completion of the Rankine cycle is determined.

REFERENCE DOCUMENT LIST

Patent Document

Patent Document 1: Japanese Patent Application Laid-open Publication No. 2009-97387

SUMMARY OF THE INVENTION

Problems to be Solved by the Invention

However, in the conventional waste-heat reusing device, the time required up to the start-up completion of the Rankine cycle, that is, the time until the expander pressure difference becomes a predetermined pressure difference after closing the bypass valve has not been considered at all.

Until the expander pressure difference becomes the predetermined pressure difference, it is not possible to obtain a sufficient output from the expander, and when the expander pressure difference does not become the predetermined pressure difference even if a certain amount of time has passed, there is a high possibility that a state, in which the expander pressure difference does not become the predetermined pressure difference, continues for a relatively long time even thereafter. For this reason, in the conventional waste-heat reusing device, the time in which the Rankine cycle is actuated (operated) with low efficiency may be extended.

In contrast, when the expander pressure difference does not become the predetermined pressure difference even if a certain amount of time has passed, it may also be considered not to actuate the Rankine cycle, but such a case is undesirable because there is a risk of a decrease in opportunities for actuating the Rankine cycle.

The present invention has been made in view of such points, and an object thereof is to provide an exhaust heat recovery device provided with a Rankine cycle, capable of preventing the opportunities for actuating the Rankine cycle from being decreased and capable of efficiently operating the Rankine cycle.

Means for Solving the Problems

An exhaust heat recovery device according to an aspect of the invention includes: a Rankine cycle in which a heater configured to heat and vaporize refrigerant by exhaust heat of an external heat source, an expander configured to generate power by expanding the refrigerant passed through the heater, a condenser configured to condense the refrigerant passed through the expander, and a pump configured to send the refrigerant passed through the condenser to the heater are disposed in a circulation passage of the refrigerant; a bypass flow passage that allows the refrigerant to circulate while bypassing the expander; a bypass valve that opens and closes the bypass flow passage; a pressure difference determining unit that determines a pressure difference between a high-pressure side and a low-pressure side of the Rankine cycle; and a control unit that executes start-up control of the Rankine cycle, the start-up control actuating the pump with the bypass valve open and then closing the bypass valve, the control unit repeatedly executing the start-up control when the pressure difference after closing the bypass valve does not reach a start-up completion determination value of the Rankine cycle within a predetermined time.

An exhaust heat recovery device according to another aspect of the invention includes: a Rankine cycle in which a heater configured to heat and vaporize refrigerant by exhaust heat of an external heat source, an expander configured to generate power by expanding the refrigerant passed through the heater, a condenser configured to condense the refrigerant passed through the expander, and a pump configured to send the refrigerant passed through the condenser to the heater are disposed in a circulation passage of the refrigerant; a bypass flow passage that allows the refrigerant to circulate while bypassing the expander; a bypass valve that opens and closes the bypass flow passage; a pressure difference determining unit that determines a pressure difference between a high-pressure side and a low-pressure side of the Rankine cycle; and a control unit that, when starting up the Rankine cycle, executes control to actuate the pump with the bypass valve open, and then to close the bypass valve when the pressure difference becomes a predetermined value, the control unit executing control to open the bypass valve when the pressure difference does not reach a start-up completion determination value greater than a first predetermined value within a predetermined time after closing of the bypass valve when the pressure difference becomes the first predetermined value, and then to close the bypass valve when the pressure difference becomes a second predetermined value greater than the first predetermined value and less than the start-up completion determination value.

Effects of the Invention

According to the exhaust heat recovery device, when starting up the Rankine cycle, when the pressure difference between the high-pressure side and the low-pressure side of the Rankine cycle does not reach the start-up completion determination value within the predetermined time after the refrigerant is made to circulate via the expander by closing the bypass valve from the state in which the refrigerant circulates while bypassing the expander, the bypass valve is opened, and then, after making the refrigerant circulate while bypassing the expander, the bypass valve is closed again. As a result, the refrigerant can be circulated via the expander while the time in which the Rankine cycle is actuated with low efficiency can be prevent from being extended, and while the possibility that the Rankine cycle reaches the start-up completion is increased. As a result, the opportunities for actuating the Rankine cycle can be prevented from being decreased, and the Rankine cycle can be efficiently operated.

MODE FOR CARRYING OUT THE INVENTION

Hereinafter, an embodiment of the present invention will be described with reference to the accompanying drawings.

Figure 1:
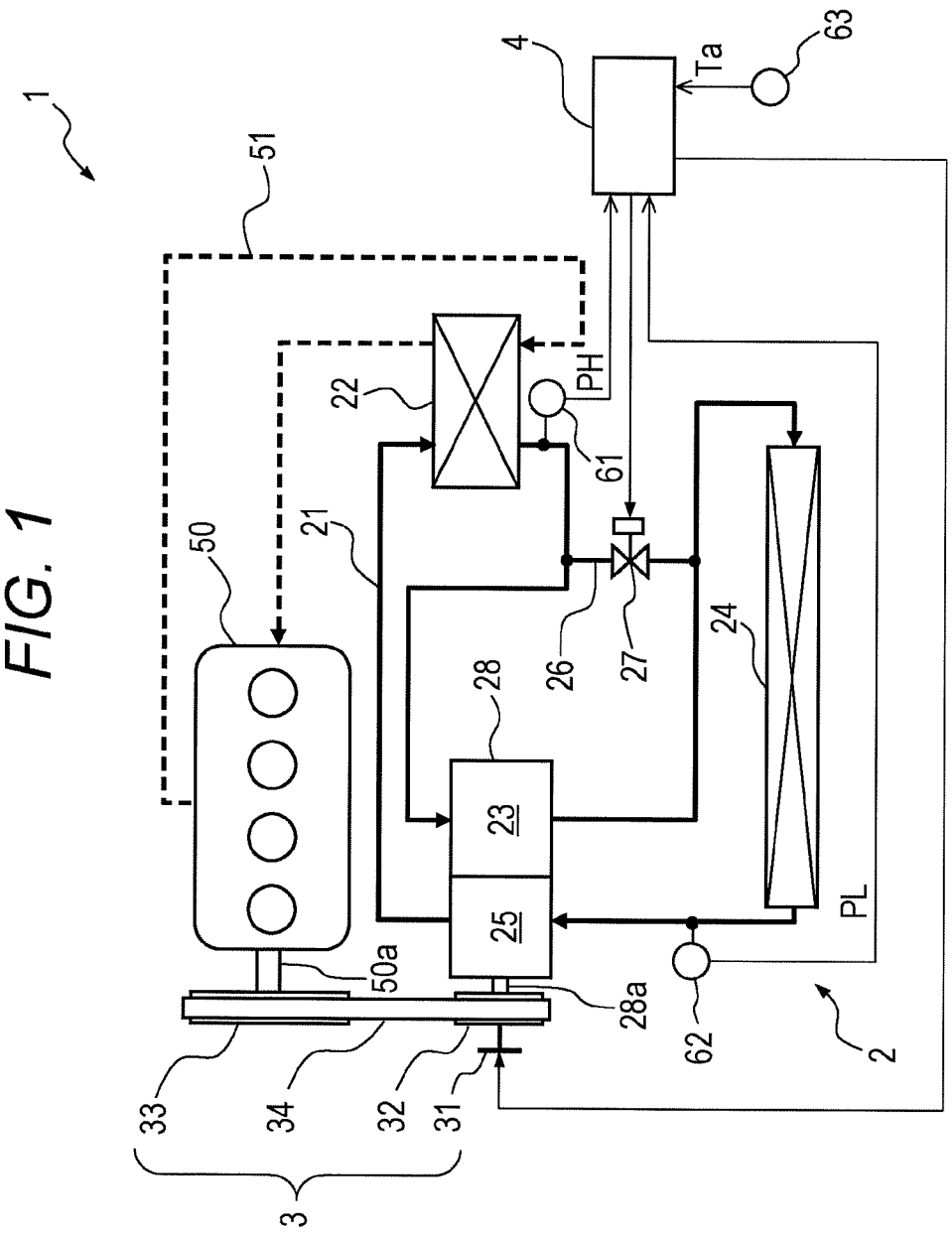
FIG. 1 is a diagram illustrating a schematic configuration of an exhaust heat recovery device according to an embodiment of the present invention.

FIG. 1 illustrates a schematic configuration of an exhaust heat recovery device 1 according to an embodiment of the present invention. The exhaust heat recovery device 1 is mounted on a vehicle, and recovers and uses exhaust heat of an engine 50 of the vehicle.

As illustrated in FIG. 1, the exhaust heat recovery device 1 includes: a Rankine cycle 2 that recovers the exhaust heat of the engine 50 and converts the exhaust heat into power; a transmission mechanism 3 that performs power transmission between the Rankine cycle 2 and the engine 50; and a control unit 4 that controls the overall operation of the exhaust heat recovery device 1.

The engine 50 is a water-cooled internal combustion engine and is cooled by engine cooling water that circulates in a cooling water flow passage 51. A heater 22 of the Rankine cycle 2 to be described later is arranged on the cooling water flow passage 51, so that the engine cooling water that has absorbed heat from the engine 50 flows through the heater 22.

The Rankine cycle 2 recovers the exhaust heat (heat of the engine cooling water in this case) of the engine 50 as an external heat source, converts it into power, and outputs the power.

In a refrigerant circulation passage 21 of the Rankine cycle 2, there are arranged the heater 22, an expander 23, a condenser 24, and a pump 25, in this order. Furthermore, between the heater 22 and the condenser 24, a bypass passage 26 through which refrigerant flows to bypass the expander 23 is provided, and a bypass valve 27 that opens and closes the bypass passage 26 is provided in the bypass passage 26. Operation of the bypass valve 27 is controlled by the control unit 4.

The heater 22 is a heat exchanger which heats the refrigerant to obtain superheated vapor, by performing heat exchange between the engine cooling water that has absorbed heat from the engine 50 and the refrigerant. Alternatively, although not illustrated, the heater 22 may be configured to perform heat exchange between the refrigerant and the exhaust gas of the engine 10, instead of the engine cooling water.

The expander 23 is, for example, a scroll-type expander, and generates power (driving force) by expanding the refrigerant, which is the superheated vapor heated by the heater 22, and by converting it into rotational energy.

The condenser 24 is a heat exchanger which cools and condenses (liquefies) the refrigerant, by performing heat exchange between the refrigerant passed through the expander 23 and the ambient air.

The pump 25 is a mechanical pump that sends the refrigerant (liquid refrigerant) liquefied by the condenser 24 to the heater 22. Thus, since the refrigerant, which has been liquefied by the condenser 24, is sent to the heater 22 by the pump 25, the refrigerant circulates through each of the elements of the Rankine cycle 2.

Here, in this embodiment, the expander 23 and the pump 25 are integrally connected and configured as a "pump-integrated expander 28" having a common rotating shaft 28a. That is, the rotating shaft 28a of the pump-integrated expander 28 has a function as an output shaft of the expander 23 and a function as a drive shaft of the pump 25.

The transmission mechanism 3 has a pulley 32 that is attached to the rotating shaft 28a of the pump-integrated expander 28 via an electromagnetic clutch 31, a crank pulley 33 that is attached to a crankshaft 50a of the engine 50, and a belt 34 that is wrapped around the pulley 32 and the crank pulley 33. The electromagnetic clutch 31 is controlled to be turned on (engaged) and turned off (disengaged) by the control unit 4, so that the transmission mechanism 3 transfers and cuts off power between the engine 50 and the Rankine cycle 2 (more specifically, the pump-integrated expander 28).

Measurement signals of various sensors, such as a first pressure sensor 61 configured to measure a high-pressure side pressure PH of the Rankine cycle 2, a second pressure sensor 62 configured to measure a low-pressure side pressure PL of the Rankine cycle 2, and a temperature sensor 63 configured to measure a temperature Ta of ambient air, are input to the control unit 4. When starting up the Rankine cycle 2, the control unit 4 executes start-up control of the Rankine cycle 2 (hereinafter, simply referred to as "Rankine start-up control") to be described later.

The high-pressure side pressure PH of the Rankine cycle 2 refers to a pressure in the refrigerant circulation passage 21 in a section extending from (the outlet of) the pump 25 to (the inlet of) the expander 23 through the heater 22, and the low-pressure side pressure PL of the Rankine cycle 2 refers to a pressure in the refrigerant circulation passage 21 in a section extending from (the outlet of) the expander 23 to (the inlet of) the pump 25 through the condenser 24. In this embodiment, the first pressure sensor 61 measures the pressure on the inlet side of the expander 23 (the outlet side of the heater 22) as the high-pressure side pressure PH of the Rankine cycle 2, and the second pressure sensor 62 measures the pressure on the inlet side of the pump 25 (the outlet side of the condenser 24) as the low-pressure side pressure PL of the Rankine cycle 2.

Next, the Rankine start-up control executed by the control unit 4 will be described.

The pump 25 is a liquid feeding pump, and it is assumed that the refrigerant on the inlet side of the pump 25 is in a liquid-phase state (liquid refrigerant). However, when the pump 25 is installed at a position higher than a refrigerant liquid level in a receiver tank (not illustrated), for example, due to a limitation on a layout, the refrigerant on the inlet side of the pump 25 may become a gaseous-phase state (gaseous refrigerant) during stop of the Rankine cycle 2. If the pump is actuated in a state in which the gaseous refrigerant is mixed on the inlet side of the pump 25 in this manner, a sufficient amount of circulating refrigerant cannot be obtained, and accordingly, it takes a long time to start up the Rankine cycle 2, or there might be a risk of failure in start-up of the Rankine cycle 2. For this reason, when starting up the Rankine cycle 2, it is necessary that the refrigerant of the inlet side of the pump be liquid refrigerant as much as possible.

Here, it has been confirmed that in a condition in which the gaseous refrigerant is mixed into the refrigerant on the inlet side of the pump 25, it is possible to shorten the time until the refrigerant on the inlet side of the pump 25 becomes approximately 100% of liquid refrigerant, by operating the pump 25 with the bypass valve 27 open, that is, by circulating the refrigerant while bypassing the expander 23. This may be believed to be due to the following reasons. That is, if the refrigerant circulates via the expander 23, expansion of the refrigerant occurs in the expander 23, and thus, the low-pressure side pressure PL decreases, and the condensation temperature decreases. For this reason, in the condenser 24, the temperature difference between the condensation temperature and the temperature of the passing air is reduced, resulting in an operation state in which the degree of supercooling (subcooling) of the refrigerant is hard to increase.

Furthermore, the inventors have confirmed that, in a case in which the refrigerant is circulated with the bypass valve 27 open, and the bypass valve 27 is closed after the refrigerant on the inlet side of the pump 25 is sufficiently liquefied, more specifically, after the refrigerant on the inlet side of the pump 25 becomes approximately 100% of liquid refrigerant, the reliability of the start-up of the Rankine cycle 2 can be improved.

Therefore, at the time of starting up the Rankine cycle 2, by actuating the pump 25 with the bypass valve 27 open at first, and then, by closing the bypass valve 27 after the refrigerant on the inlet side of the pump 25 is sufficiently liquefied, in other words, after a parameter indicating the condensation capacity of the condenser 24 becomes a predetermined value or more, the start-up performance (rapidity and reliability of start-up) of the Rankine cycle 2 can be improved and the Rankine cycle 2 can be efficiently operated with the operating time, in which output of the Rankine cycle 2 is negative, reduced to a minimum required time.

Thus, in this embodiment, the control unit 4 executes control to actuate the pump 25 with the bypass valve 27 open at first, and executes control to close the bypass valve 27 when a parameter indicating the condensation capacity of the condenser 24 becomes a predetermined value or more, that is, the control unit 4 executes Rankine start-up control, in which a valve-closing condition of the bypass valve 27 is that the parameter indicating the condensation capacity in the condenser 24 is a predetermined value or more.

Here, in this embodiment, a pressure difference $\Delta P$ between the high-pressure side pressure PH and the low-pressure side pressure PL of the Rankine cycle 2 is used as a parameter indicating the condensation capacity of the condenser 24. The reasons are as follows.

As a ratio of the liquid refrigerant on the inlet side of the pump 25 increases, the refrigerant flow rate increases, and the condensation capacity in the condenser 22 also increases (condensation capacity=refrigerant enthalpy difference before and after condenser×refrigerant flow rate). Thus, the refrigerant flow rate is a value indicating magnitude of the condensation capacity. Moreover, the refrigerant flow rate is correlated with the pressure loss of the refrigerant circuit (as the refrigerant flow rate increases, the pressure loss of the refrigerant circuit also increases). When the bypass valve 27 is open, the pressure difference $\Delta P$ between the high-pressure side and the low-pressure side is equal to the pressure loss of the refrigerant circuit, and accordingly, the pressure difference is a value having a correlation with the refrigerant flow rate. Therefore, by determining the pressure difference $\Delta P$, it is possible to easily determine (detect) the condensation capacity of the condenser 24, more specifically, whether the refrigerant on the inlet side of the pump 25 becomes substantially 100% of liquid refrigerant, and the use of the pressure difference $\Delta P$, which has less hunting or the like, can achieve a stable control. Furthermore, by determining the pressure difference $\Delta P$, it is also possible to determine, after closing the bypass valve 27, whether the expander 23 is in a state capable of generating power (driving force), that is, whether the start-up of the Rankine cycle 2 is completed.

Figure 2:
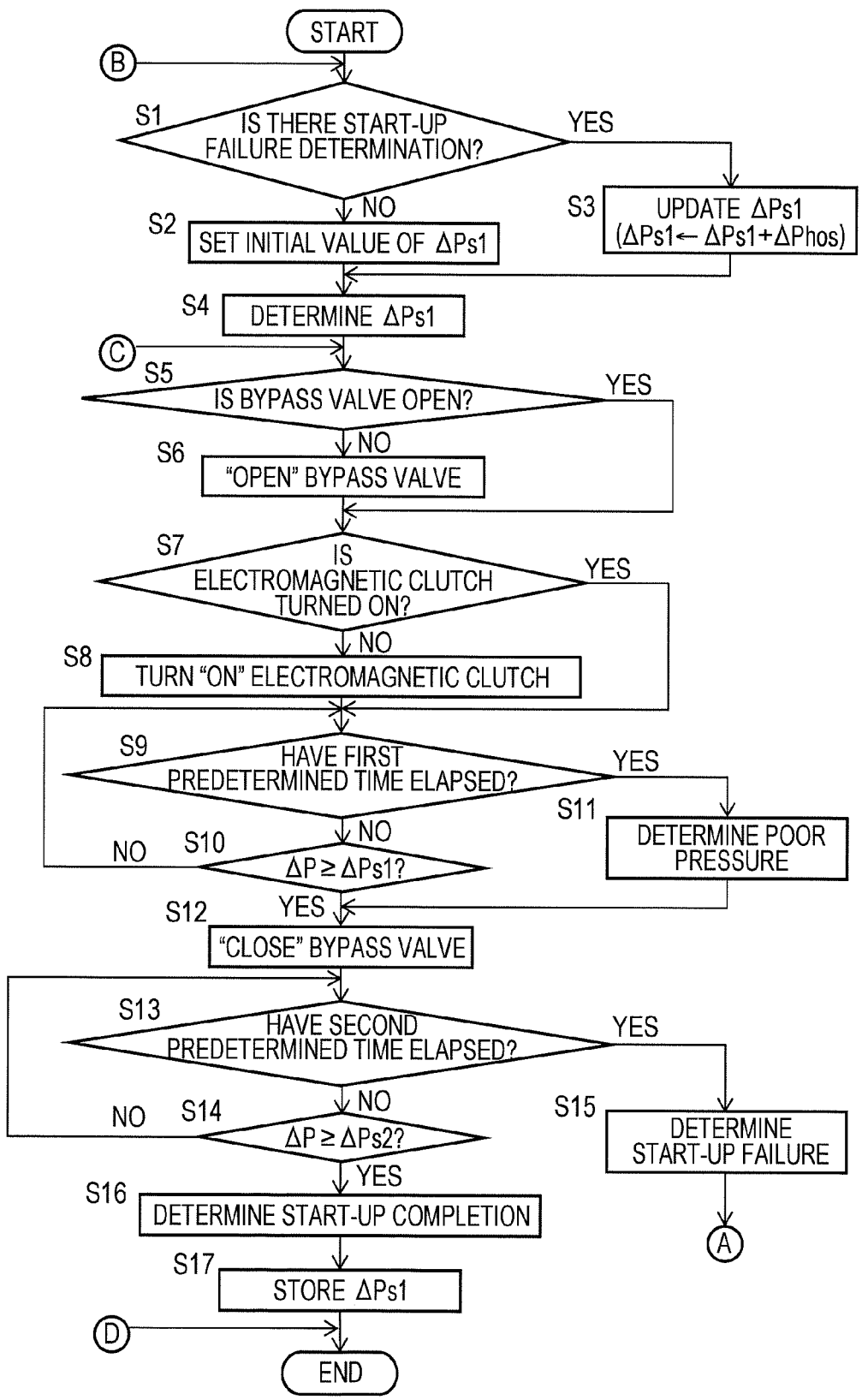
FIG. 2 is a flowchart illustrating Rankine start-up control in the embodiment.
Figure 3:
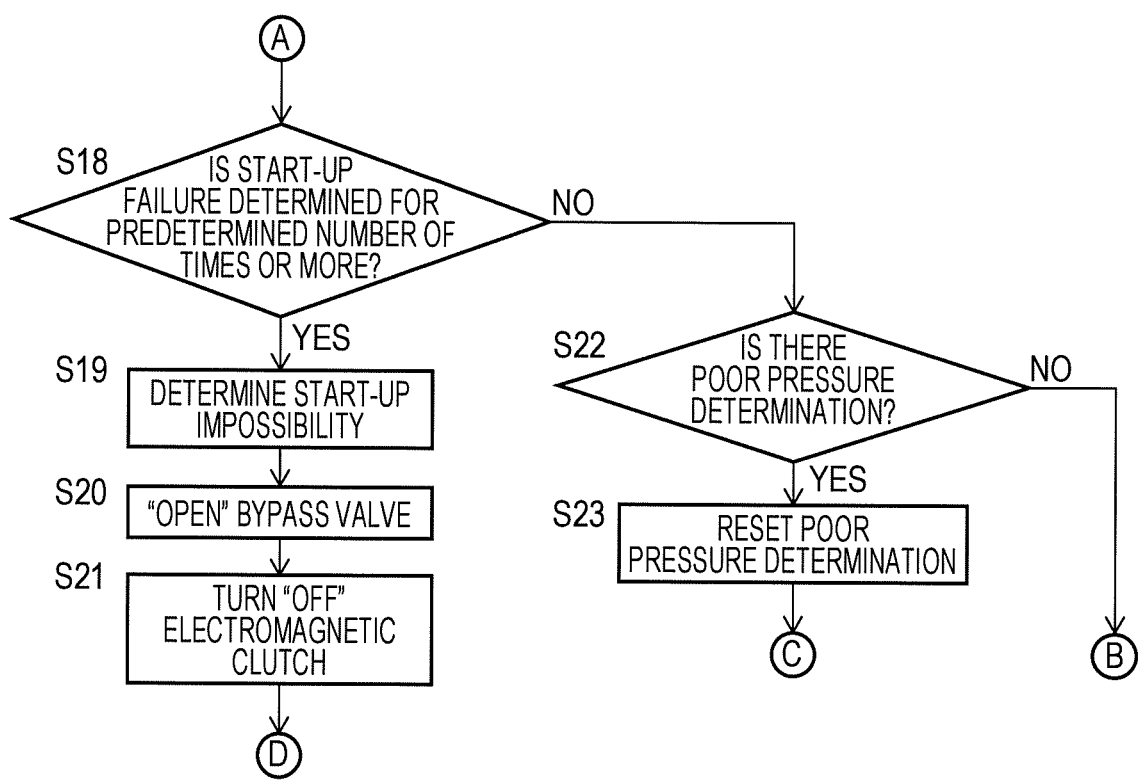
FIG. 3 is a flowchart illustrating the Rankine start-up control in the embodiment.

FIGS. 2 and 3 are flowcharts of the Rankine start-up control.

The control in these flowcharts is initiated, for example, upon receiving the operation request or the operation permission of the Rankine cycle 2.

At step S1, it is determined whether "start-up failure" has been determined (see step S15 to be described later). When the "start-up failure" has not been determined, that is, when it is the first time the Rankine start-up control is executed, the process proceeds to step S2, and when the "start-up failure" has been determined, that is, in the redone Rankine start-up control, the process proceeds to step S3.

At step S2, an initial value of a valve-closing determination value (pressure) $\Delta Ps1$ for determining whether the bypass valve 27 is closed is set. Basically, a reference value (for example, any value between 0.1 to 0.25 MPa) of the valve-closing determination value $\Delta Ps1$ that is set in advance to a pressure difference between the high-pressure side and the low-pressure side of the Rankine cycle 2 when a sufficient amount of liquid refrigerant (substantially 100%) is supplied to the pump 25 on the inlet side thereof, is set as the initial value.

However, when the start-up completion was determined after the valve-closing determination value $\Delta Ps1$ was updated in the previous Rankine start-up control, the stored valve-closing determination value $\Delta Ps1$ after the update is set as the initial value (see step S17 which will be described later).

At step S3, the valve-closing determination value $\Delta Ps1$ is updated (increase correction). Specifically, the valve-closing determination value $\Delta Ps1$ is updated by adding a correction value $\Delta Phos$ to the valve-closing determination value $\Delta Ps1$, which is a currently determined (set) value ($\Delta Ps1 \leftarrow \Delta Ps1 + \Delta Phos$). The correction value $\Delta Phos$ may be, for example, 0.02 MPa.

Here, the valve-closing determination value $\Delta Ps1$ has an upper limit value, and the valve-closing determination value $\Delta Ps1$ updated (increase correction) at step S3 is limited to the upper limit value or less. In addition, the upper limit value used herein may be any value between 0.25 to 0.4 MPa.

At step S4, the valve-closing determination value $\Delta Ps1$ to be used at step S10 which will be described later is determined.

When it is immediately after the start-up of the Rankine start-up control and when the "start-up failure" has not been determined, the initial value set at step S2 (that is, the reference value of the valve-closing determination value $\Delta Ps1$ or the valve-closing determination value $\Delta Ps1$ after update, which was updated and stored in the previous Rankine start-up control) is set as the valve-closing determination value $\Delta Ps1$ to be used at step S9, as it is.

Meanwhile, when the "start-up failure" is determined at step S15 which will be described below and the Rankine start-up control is redone, the valve-closing determination value $\Delta Ps1$ updated (corrected) at step S3 is set as the valve-closing determination value $\Delta Ps1$ to be used at step S10. Therefore, the valve-closing determination value $\Delta Ps1$ to be used at step S10 increases by the correction value $\Delta Phos$ each time the "start-up failure" is determined at step S15, but the valve-closing determination value $\Delta Ps1$ after correction (update) is limited to the upper limit value or less.

At step S5, it is determined whether the bypass valve 27 is open. When the bypass valve 27 is closed, the process proceeds to step S6, and when the bypass valve 27 is open, the process proceeds to step S7.

At step S6, the bypass valve 27 is opened.

In this embodiment, during stop of the Rankine cycle 2, the bypass valve 27 is open typically. For this reason, in the first Rankine start-up control, the process of the above-described step S6 may be typically omitted. Meanwhile, in the redone Rankine start-up control after a start-up failure (see step S15 which will be described below), since the bypass valve 27 is closed (see step S12 which will be described below), the bypass valve 27 is opened at the above-described step S6.

At step S7, it is determined whether the electromagnetic clutch 31 is turned on (engaged). When the electromagnetic clutch 31 is not turned on, that is, when it is the first time the Rankine start-up control is executed, the process proceeds to step S8, and when the electromagnetic clutch 31 is already turned on, that is, when the Rankine start-up control is redone, the process proceeds to step S9.

At step S8, the electromagnetic clutch 31 is turned on (engaged). When the electromagnetic clutch 31 is turned on, the rotating shaft 28a is driven to rotate by the engine 50, and the pump 25 is actuated.

At the above-described steps S5 to S8, the refrigerant circulates while bypassing the expander 23.

At step S9, it is determined whether a first predetermined time has elapsed from the beginning of the circulation of the refrigerant with the expander 23 bypassed. That is, in the first Rankine start-up control is executed, it is determined whether the first predetermined time has elapsed after turning on the electromagnetic clutch 31 at step S8, and in redoing of the Rankine start-up control, it is determined whether the first predetermined time has elapsed after opening the bypass valve 27 at step S6. When the first predetermined time has not elapsed, the process proceeds to step S10. Meanwhile, when the first predetermined time has elapsed, the process proceeds to step S11 and the "poor pressure" is determined, and then, the process proceeds to step S12. The first predetermined time is set in advance to a period of time enough to sufficiently liquefy the refrigerant on the inlet side of the pump 25 (enough to be substantially 100% of liquid refrigerant) by actuating the pump 25 with the bypass valve 27 open, and the first predetermined time may be, for example, 120 seconds.

At step S10, it is determined whether the pressure difference $\Delta P$ between the high-pressure side pressure PH and the low-pressure side pressure PL of the Rankine cycle 2 is equal to or greater than the valve-closing predetermined value $\Delta Ps1$ determined (set) at step S4. When the pressure difference $\Delta P$ is less than the valve-closing determination value $\Delta Ps1$, the process returns to step S9, and when the pressure difference $\Delta P$ is equal to or greater than the predetermined value $\Delta Ps1$, the process proceeds to step S12.

At step S12, the bypass valve 27 is closed. Thus, the refrigerant circulates via the expander 23. Moreover, when the bypass valve 27 is closed, the process proceeds to step S13.

By the above-described steps S9 to S12, it is determined whether the pressure difference $\Delta P$ reaches the valve-closing determination value $\Delta Ps1$ within the first predetermined time from the beginning of the circulation of the refrigerant with the expander 23 bypassed, that is, whether the condition of valve closing of the bypass valve 27 is satisfied. When the pressure difference $\Delta P$ reaches the valve-closing determination value $\Delta Ps1$ within the first predetermined time, the bypass valve 27 is closed and the refrigerant is made to circulate via the expander 23. Meanwhile, when the pressure difference $\Delta P$ does not reach the valve-closing determination value $\Delta Ps1$ within the first predetermined time, the "poor pressure" is determined. In this case, also in a case in which the "poor pressure" is determined, the bypass valve 27 is closed and the refrigerant is made to circulate via the expander 23; however, the electromagnetic clutch 31 may be turned off (disengaged) to terminate the Rankine start-up control.

Here, the initial value of the valve-closing determination value $\Delta Ps1$ set at the above-described step S2 (that is, the reference value of the valve-closing determination value $\Delta Ps1$ or the valve-closing determination value $\Delta Ps1$ after update in the previous Rankine control) may be corrected based on a temperature Ta of ambient air. In this case, the initial value of the valve-closing determination value $\Delta Ps1$ is corrected to a greater value as the temperature Ta of ambient air decreases.

As the temperature Ta of ambient air decreases, the radiation performance of the condenser 24 increases, and the condensation temperature and the refrigerant temperature at the inlet of the pump 25 decreases. As a result, the refrigerant temperature at the inlet of the heater 22 on the high-pressure side also decreases, and the amount of liquid-phase refrigerant increases inside the heater 22. Therefore, the amount of refrigerant on the low-pressure side decreases, and the degree of supercooling at the inlet of the pump 25 also decreases. Thus, on condition that the ambient air is low, an operation state becomes a state in which the degree of supercooling at the inlet of the pump 25 is hard to increase. That is, the inlet of the pump 25 becomes a condition in which the refrigerant is hard to be liquefied. Therefore, in a case in which the temperature Ta of ambient air is low, when it is determined whether to close the bypass valve 27 using the same determination reference value, there is a possibility that the refrigerant at the inlet of the pump 25 is not sufficiently liquefied and a condition unfavorable to the start-up of the Rankine cycle 2 may occur.

Therefore, the control unit 4 corrects the initial value of the valve-closing determination value $\Delta Ps1$ to a greater value as the temperature Ta of ambient air decreases. This cases the timing of closing the bypass valve 27 to be substantially delayed as the temperature Ta of ambient air decreases, and the inlet of the pump 25 becomes a condition in which the refrigerant is easily liquefied, and thus, it is possible to improve the reliability of the start-up. For example, if the initial value of the valve-closing determination value $\Delta Ps1$ is about 0.15 MPa when the temperature Ta of ambient air is 25° C., the initial value of the valve-closing determination value $\Delta Ps1$ can be set to about 0.2 MPa when the temperature Ta of ambient air is about 5° C.

Similar to the case in which the temperature Ta of ambient air is low, when the flow rate of ambient air passing through (outside of) the condenser 24 increases, the heat radiation performance of the condenser 24 also becomes higher. Therefore, the control unit 4 may be input with a vehicle speed, for example, from an engine control unit (not illustrated) and the initial value of the valve-closing determination value $\Delta Ps1$ may be corrected based on the input vehicle speed. In this case, the initial value of the valve-closing determination value $\Delta Ps1$ is corrected to a greater value as the vehicle speed increases. It should be apparent that the control unit 4 may correct (set) the initial value of the valve-closing determination value $\Delta Ps1$ based on both the temperature Ta of ambient air and the vehicle speed.

Returning to FIG. 2, at step S13, it is determined whether a second predetermined time (<the first predetermined time) has elapsed after closing the bypass valve 27 at step S12. When the second predetermined time has not elapsed, the process proceeds to step S14. Meanwhile, when the second predetermined time has elapsed, the process proceeds to step S15 and the "start-up failure" is determined, and then, the process proceeds to step S18. The second predetermined time used here is set in advance to a period of time in which, in the normal operation (actuation) of the Rankine cycle 2, the pressure difference $\Delta P$ can reach a start-up completion determination value $\Delta Ps2$ for determining the completion of the start-up of the Rankine cycle 2 (see step S14 which will be described below), and may be, for example, 30 seconds.

At step S14, it is determined whether the pressure difference $\Delta P$ between the high-pressure side pressure PH and the low-pressure side pressure PL of the Rankine cycle 2 is equal to greater than the start-up completion determination value $\Delta Ps2$ (>valve-closing determination value $\Delta Ps1$). The start-up completion determination value $\Delta Ps2$ is set depending on the Rankine cycle 2, and may be, for example, 0.8 MPa. When the pressure difference $\Delta P$ is less than the start-up completion determination value $\Delta Ps2$, the process returns to step S13.

Meanwhile, at step S14, when the pressure difference $\Delta P$ is equal to or greater than the start-up completion determination value $\Delta Ps2$, the process proceeds to step S16 and the "start-up completion" is determined, the currently set (determined) valve-closing determination value $\Delta Ps1$ is stored at step S17, and the flow (that is, the Rankin start-up control) is terminated. The valve-closing determination value $\Delta Ps1$ stored at step S17 is set as an initial value of the valve-closing determination value $\Delta Ps1$ in the next Rankine start-up control (see the above-described step S2). However, if the initial value of the valve-closing determination value $\Delta Ps1$ set at the above-described step S2 is corrected based on the temperature Ta of ambient air and/or the vehicle speed, the valve-closing determination value $\Delta Ps1$ stored at step S17 becomes a value that is obtained by subtracting the correction amount due to the temperature Ta of ambient air and/or the correction amount due to the vehicle speed.

By the above-described steps S13 to S17, it is determined whether the pressure difference $\Delta P$ reaches the start-up completion determination value $\Delta Ps2$ within the second predetermined time after closing the bypass valve 27, and when the pressure difference $\Delta P$ reaches the start-up completion determination value $\Delta Ps2$ within the second predetermined time, it is determined that the start-up of the Rankine cycle 2 is completed. Meanwhile, when the pressure difference $\Delta P$ does not reach the start-up completion determination value $\Delta Ps2$ within the second predetermined time, the "start-up failure" is determined, and the process proceeds to a process at the time of "start-up failure" (FIG. 3, steps S18 to S23).

When the start-up of the Rankine cycle 2 is completed, the expander 23 is adapted to drive the pump 25 by generating the driving force, and when the driving force of the expander 23 exceeds the drive load of the pump 25, the surplus driving force is supplied to the engine 50 via the transmission mechanism 3 to assist the engine output.

At step S18 (FIG. 3), it is determined whether the "start-up failure" determination continues for a predetermined number of times (for example three times to five times). When the "start-up failure" determination continues for the predetermined number of times, the process proceeds to step S19 and the "start-up impossibility" is determined, and thereafter, the bypass valve 27 is opened at step S20, and the electromagnetic clutch 31 is turned off (disengaged) at step S21, to terminate the flow (Rankine start-up control). In this case, the actuation (operation) of the Rankine cycle 2 is not performed. Here, when the "start-up impossibility" is determined, since it is assumed that there are some kinds of abnormality in the Rankine cycle 2, such as a shortage of the amount of refrigerant, it is preferable to notify the occupant or the like of the vehicle that there is abnormality in the Rankine cycle 2 by a warning light, a display, or the like.

Meanwhile, when the number of the "start-up failure" determinations is less than the predetermined number of times, the process proceeds to step S22, to determine whether the "poor pressure" (see step S11) has been determined.

When the "pressure failure" has not been determined, the process returns to step S1, to redo (repeat) the Rankine start-up control. In redoing of the Rankine start-up control in this case, the valve-closing determination value $\Delta Ps1$ is updated at step S3 (increase correction).

When the "pressure failure" has been determined, the "poor pressure" determination is reset (cancelled) at step S23, and then, the process returns to step S5, to redo (repeat) the Rankine start-up control. In redoing of the Rankine start-up control in this case, unlike redoing of the Rankine start-up control when the "pressure failure" has not been determined, updating of the valve-closing determination value $\Delta Ps1$ (increase correction) is not performed.

Figure 4:
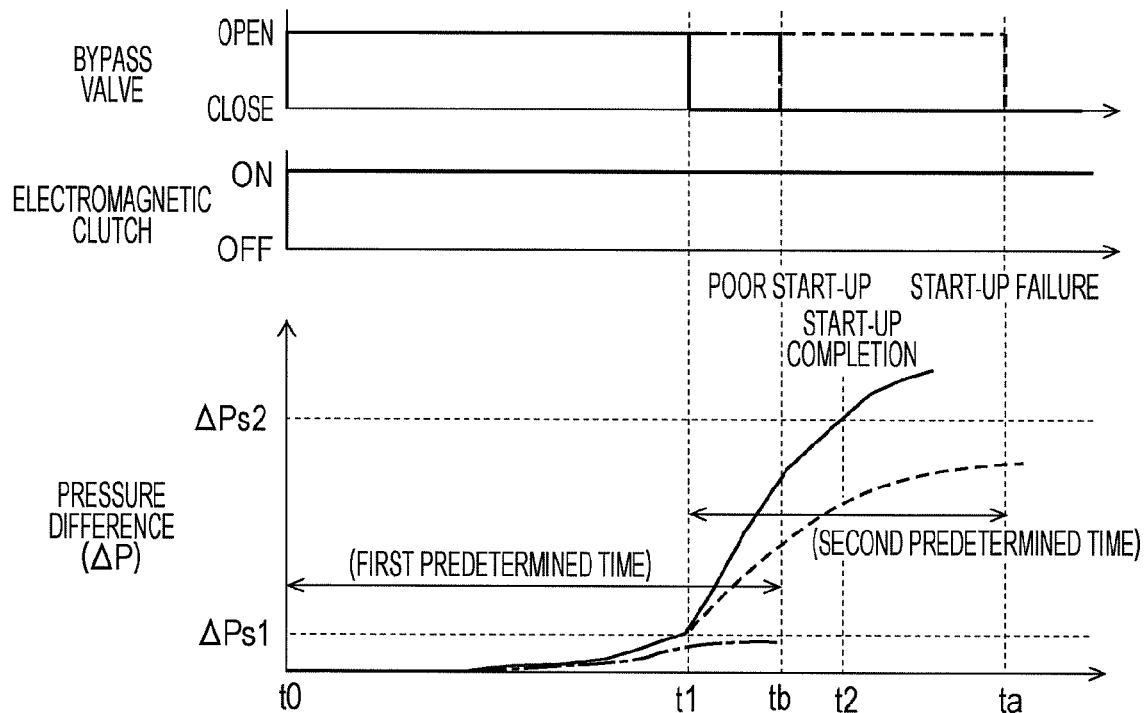
FIG. 4 is a timing diagram of the Rankine start-up control.

FIG. 4 is a timing diagram of the Rankine start-up control.

When starting up the Rankine cycle 2, the electromagnetic clutch 31 is turned on with the bypass valve 27 open (time t0). As described above, since the bypass valve 27 is open during stop of the Rankine cycle 2 in this embodiment, the electromagnetic clutch 31 is only normally turned on. However, when the bypass valve 27 is closed during stop of the Rankine cycle 2, the bypass valve 27 is opened and the electromagnetic clutch 31 is turned on. As a result, the pump 25 is activated, and the refrigerant circulates while bypassing the expander 23. Then, the degree of supercooling of the refrigerant on the outlet side of the condenser 24 increases, the flow rate of the liquid refrigerant supplied to the Rankine cycle 2 on the high-pressure side thereof increases, and the pressure difference ΔP between the high-pressure side pressure PH and the low-pressure side pressure PL also increases along with this.

Moreover, when the pressure difference ΔP increases to the valve-closing determination value ΔPs1, it is determined that a state in which the condensation performance in the condenser 24 is sufficiently high has been obtained and the refrigerant (liquid refrigerant), approximately 100% of which is liquefied, is continuously supplied to the pump 25 on the inlet side thereof. Then, the bypass valve 27 is closed (time t1). Thus, the refrigerant circulates via the expander 23.

When the bypass valve 27 is closed, the pressure difference ΔP increases at an even faster rate, and when the pressure difference ΔP increases to the start-up completion determination value ΔPs2, it is determined that the expander 23 is in a state capable of generating the driving force, that is, it is determined that the start-up of the Rankine cycle 2 is completed, and then the Rankine start-up control is terminated (time t2).

Figure 5:
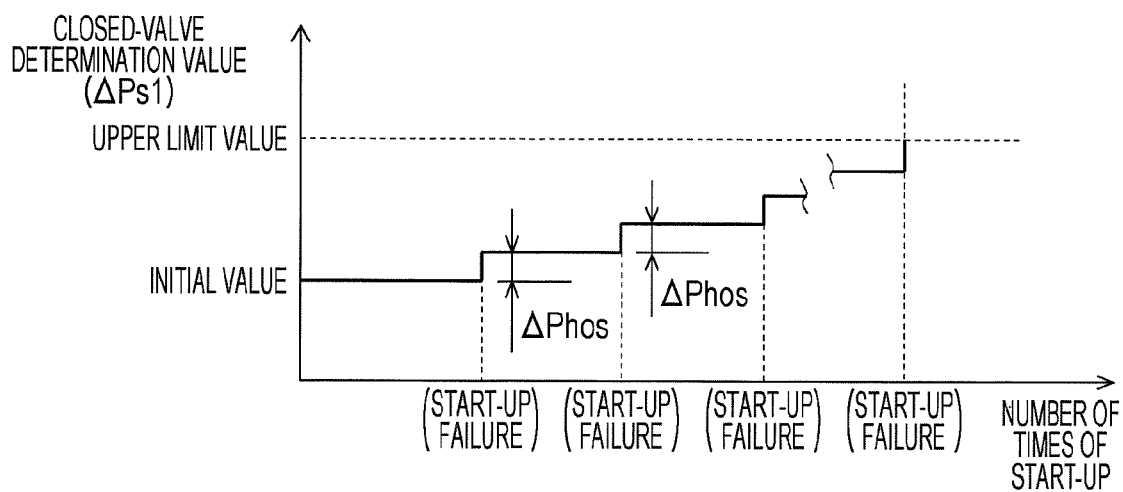
FIG. 5 is a diagram illustrating an update (increase correction) of a valve-closing determination value ΔPs1.

Here, as illustrated by broken lines in FIG. 4, when the pressure difference ΔP does not reach the start-up completion determination value ΔPs2 even if the second predetermined time has elapsed after closing the bypass valve 27 (time ta), the "start-up failure" is determined and the bypass valve 27 is opened, to circulate the refrigerant again while bypassing the expander 23. That is, the Rankine start-up control is redone. In redoing of the Rankine start-up control after determining the "start-up failure", when the "poor pressure" has not been determined, each time the "start-up failure" is determined, that is, each time the Rankine start-up control is repeated, the valve-closing determination value ΔPs1 is increased by the correction value ΔPhos, as illustrated in FIG. 5.

Furthermore, as illustrated by a dashed line in FIG. 4, when the pressure difference does not reach the valve-closing determination value ΔPs1 even if the first predetermined time has elapsed after turning on the electromagnetic clutch 31 with the bypass valve 27 open (time tb), the "poor pressure" is determined. Also in this case, if the "start-up failure" is determined thereafter, the Rankine start-up control is redone. However, in redoing of the Rankine start-up control when the "poor pressure" has been determined, unlike redoing of the Rankine start-up control when the "pressure failure" has not been determined, an increase correction of the valve-closing determination value ΔPs1 is not performed.

Then, when the "start-up failure" determination continues for a predetermined number of times, the "start-up impossibility" is determined, and the electromagnetic clutch 31 is turned off, to terminate the Rankine start-up control.

According to the above-described embodiment, when starting up the Rankine cycle 2, since the pump 25 is actuated with the bypass valve 27 open at first, even when the gaseous refrigerant is mixed into the refrigerant on the inlet side of the pump 25, it is possible to promptly solve this problem. Moreover, by closing the bypass valve 27 when the pressure difference ΔP between the high-pressure side pressure PH and the low-pressure side pressure PL of the Rankine cycle 2 becomes the valve-closing determination value ΔPs1, it is possible to circulate the refrigerant via the expander 23 immediately after the refrigerant on the inlet side of the pump 25 becomes substantially 100% of liquid refrigerant.

As a result, it is possible to improve the start-up performance (rapidity and reliability of start-up) of the Rankine cycle 2, while efficiently operating the Rankine cycle 2 by reducing as much as possible the operation time in which the output of the Rankine cycle 2 is negative, that is, the time in which the pump 25 (and the expander 23) is driven by the engine 50.

Here, when the pressure difference ΔP does not reach the start-up completion determination value ΔPs2 even when the second predetermined time has elapsed after closing the bypass valve 27, since the Rankin start-up control is redone (repeatedly executed) to try again to cause the liquefaction of the refrigerant (making the refrigerant liquefied) on the inlet side of the pump 25, it is possible to increase the possibility that the Rankine cycle 2 reaches the start-up completion.

In particular, when reaching the "start-up failure" without determination of the "poor pressure", since the increase correction of the valve-closing determination value ΔPs1 is performed each time the Rankine start-up control is executed, the bypass valve 27 can be closed after the refrigerant on the inlet side of the pump 25 is further liquefied (becoming liquid refrigerant) compared to the last Rankine start-up control. This makes it possible to further increase the possibility that the Rankine cycle 2 reaches the start-up completion.

Furthermore, when the pressure difference ΔP reaches the start-up completion determination value ΔPs2 within the second predetermined time after the increase correction of the valve-closing determination value ΔPs1, the valve-closing determination value ΔPs1, which has been subjected to the increase correction, is stored and is set as an initial value of the valve-closing determination value ΔPs1 in Rankine start-up control at the time of the next start-up of the Rankine cycle 2. This makes it possible to increase the possibility that the Rankine cycle 2 reaches the start-up completion in the first time the Rankine start-up control is executed when starting up the Rankine cycle 2.

The preferred embodiment of the invention has been described above, but it should be apparent that the invention is not intended to be limited to such embodiment, and modifications and variations can be made based on the technical ideas of the invention. Some modified examples will be described below.

Modified Example 1

In the above-described embodiment, the pressure difference ΔP between the high-pressure side pressure PH and the low-pressure side pressure PL of the Rankine cycle 2 is used as a parameter indicating the condensation capacity of the condenser 24. However, the invention is not limited to this, and in addition to or instead of the pressure difference ΔP, the degree of supercooling (subcooling) of the refrigerant on the outlet side of the condenser 24 (the inlet side of pump 25) may be used. In this case, the valve-closing condition of the bypass valve 27 is that the degree of supercooling (subcooling) of the refrigerant on the outlet side of the condenser 24 (the inlet side of the pump 25) is a predetermined value or more. Furthermore, in this case, a temperature sensor and a pressure sensor are installed between (the outlet of) the condenser 24 and (the inlet of) the pump 25, and the control unit 4 calculates (determines) the degree of supercooling of the refrigerant, based on the temperature measured by the temperature sensor and the pressure measured by the pressure sensor 52.

Moreover, when starting up the Rankine cycle, the control unit 4 executes the control to actuate the pump 25 with the bypass valve 27 open, and to close the bypass valve 27 when the degree of supercooling of the refrigerant on the outlet side of the condenser 24 becomes a predetermined value or more. The predetermined value (initial value) may be, for example, a value (refrigerant temperature) in which the refrigerant on the outlet side of the condenser 24 can be sufficiently liquefied. In addition, the increase correction is performed each time the "start-up failure" is determined. Also in this case, it is possible to obtain the same effects as that of the above-described embodiment.

Modified Example 2

The flow rate of the liquid refrigerant sent from the pump 25 may be used as a parameter indicating the condensation capacity of the condenser 24. The reason is that, as the condensation capacity of the condenser 24 increases, the flow rate of the liquid refrigerant sent from the pump 25 also increases. In this case, the valve-closing condition of the bypass valve 27 is that the flow rate of the liquid refrigerant sent from the pump 25 is a predetermined value or more. Furthermore, in this case, a flow sensor that measures the flow rate of liquid refrigerant is provided on the outlet side of the pump 25.

Moreover, when starting up the Rankine cycle, the control unit 4 executes the control to actuate the pump 25 with the bypass valve 27 open, and to close the bypass valve 27 when the flow rate of the liquid refrigerant sent from the pump 25 becomes a predetermined value or more. The predetermined value (initial value) in this case may be set, for example, to the flow rate sent from the pump 25 when the refrigerant on the inlet side of the pump 25 is sufficiently liquefied, and the increase correction is performed each time "star-up failure" is determined. Also in this case, it is possible to obtain the same effects as that of the above-described embodiment.

Furthermore, since there is a correlation between the refrigerant flow rate and the pressure loss of the condenser 24, a pressure difference between the inlet side and the outlet side of the condenser 24 may be used as a parameter indicating the condensation capacity of the condenser 24. In this case, the valve-closing condition of the bypass valve 27 is that the pressure difference between the inlet side and the outlet side of the condenser 24 is a predetermined value or more. Furthermore, in this case, a pressure sensor is provided on each of the inlet side and the outlet side of the condenser 24, and the control unit 4 calculates (determines) the pressure difference between the inlet side and the outlet side of the condenser 24.

Modified Example 3

Figure 6:
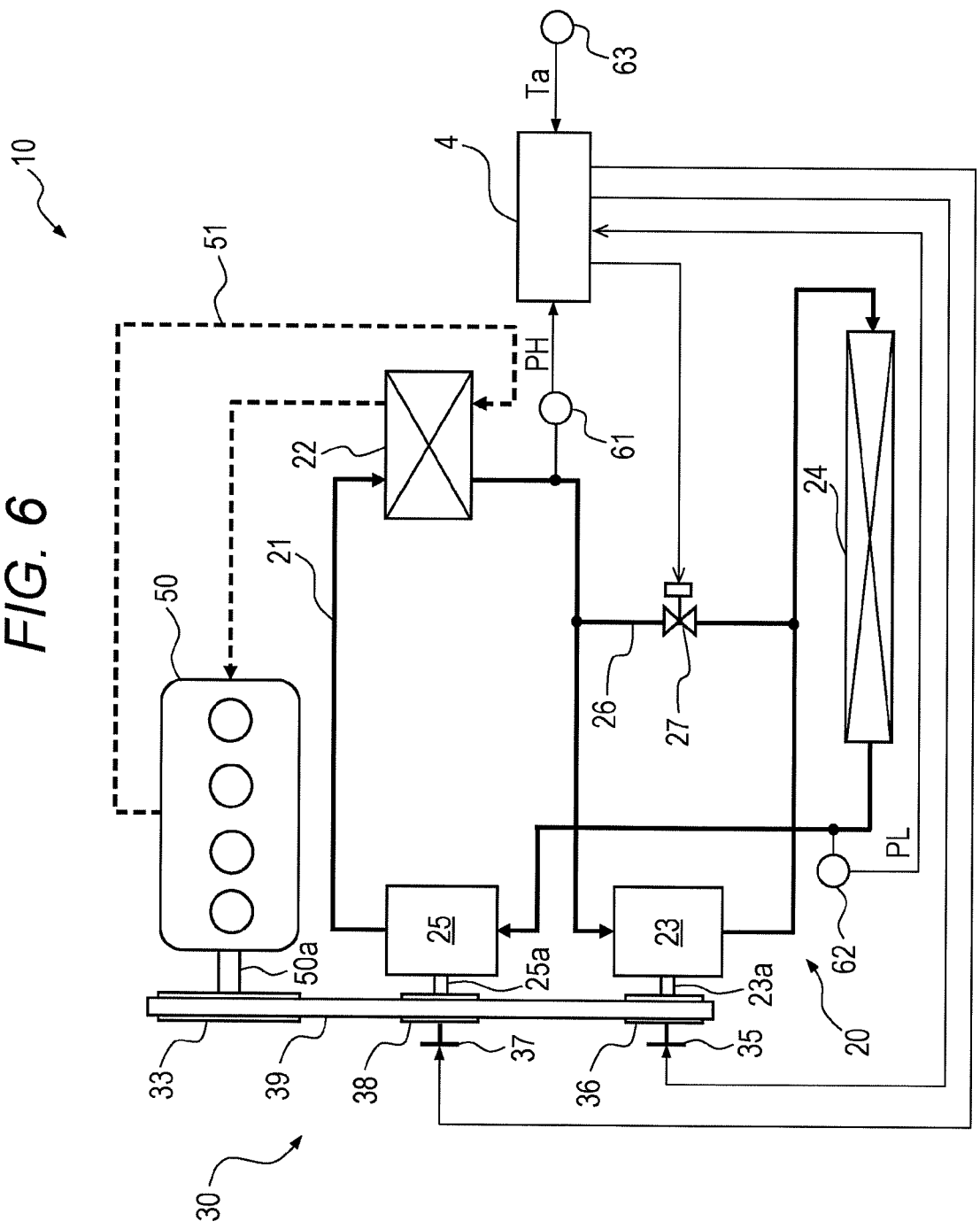
FIG. 6 is a diagram illustrating a schematic configuration of an exhaust heat recovery device according to a modified example of the embodiment.

In the above-described embodiment, the expander 23 and the pump 25 are formed as the "pump-integrated expander 28" connected by the same rotating shaft 28*a*, but as illustrated in FIG. 6, the expander 23 and the pump 25 may be separately formed. In this case, the exhaust heat recovery device 10 includes: a Rankine cycle 20 in which the expander 23 and the pump 25 are separately formed; a transmission mechanism 30; and the control unit 4.

The transmission mechanism 30 has a crank pulley 33 attached to the crankshaft 50*a* of the engine 50, an expander pulley 36 attached to an output shaft 23*a* of the expander 23 via a first electromagnetic clutch 35, a pump pulley 38 attached to the drive shaft 25*a* of the pump 25 via a second electromagnetic clutch 37, and a belt 39 that is wrapped around the crank pulley 32, the expander pulley 36, and the pump pulley 38.

Moreover, when starting up the Rankine cycle 20, the control unit 4 executes the control to open the bypass valve 27 at first and to actuate the pump 25 by turning on the second electromagnetic clutch 37, and then executes the control to turn on the first electromagnetic clutch 35 and to close the bypass valve 27, when the parameter indicating the condensation capacity of the condenser 24 becomes a predetermined value or more. Also in this case, it is possible to obtain the same effects as that of the above-described embodiment. The pump 25 may be configured as an electric pump, and the control unit 4 may be configured to output a drive signal to the pump 25.

Modified Example 4

Figure 7:
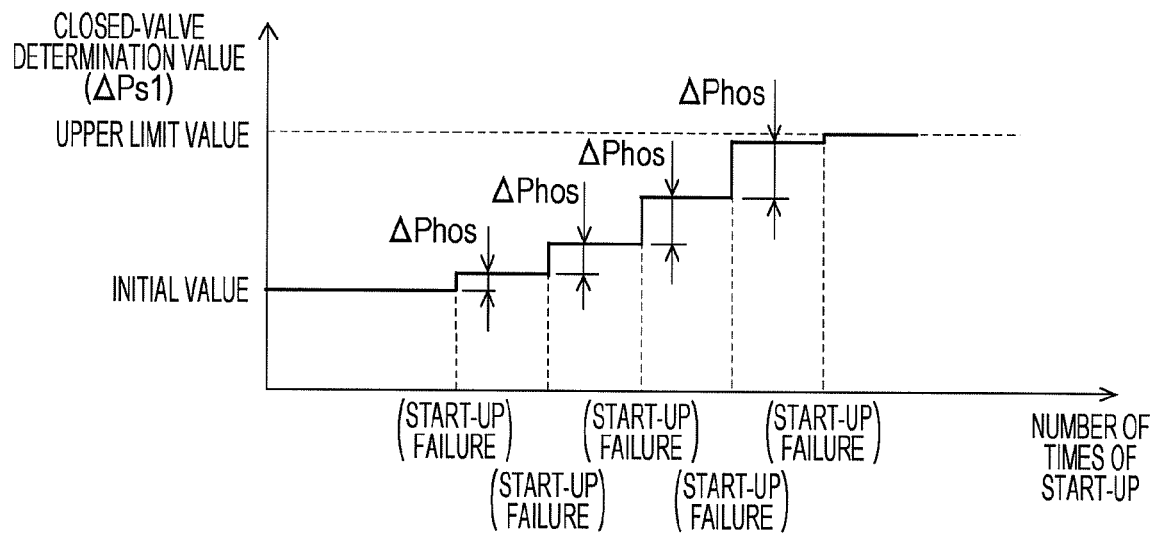
FIG. 7 is a diagram illustrating another example of an update (increase correction) of a valve-closing determination value ΔPs1.

In the above-described embodiment, each time the "start-up failure" is determined, that is, each time the Rankine start-up control is repeated, the valve-closing determination value $\Delta Ps1$ is increased by the correction value $\Delta Phos$ (see FIG. 5). However, the invention is not limited thereto. For example, as illustrated in FIG. 7, an amount of increase of the valve-closing determination value $\Delta Ps1$ (correction value $\Delta Phos$) may be increased, each time the Rankine start-up control is repeated. In this way, by gradually increasing the correction value $\Delta Phos$ each time the Rankine start-up control is repeated, it is possible to reduce the number of times of the "start-up failure".

Modified Example 5

Figure 8:
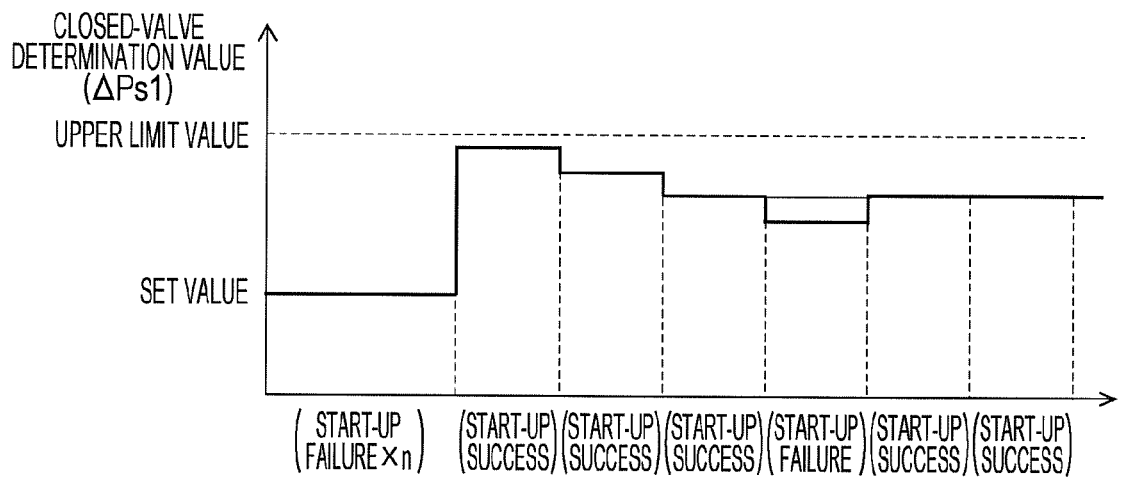
FIG. 8 is a diagram illustrating an example of a valve-closing determination value ΔPs1 that is corrected for each start-up of the Rankine cycle.

In the above-described embodiment, when the pressure difference $\Delta P$ reaches the start-up completion determination value $\Delta Ps2$ within the second predetermined time after the increase correction of the valve-closing determination value $\Delta Ps1$, that is, when the start-up of the Rankine cycle 2 is completed by repeating the Rankine start-up control, the valve-closing determination value $\Delta Ps1$ at that time (the valve-closing determination value after increase correction) is stored, and the stored valve-closing determination value is set as an initial value of the valve-closing determination value $\Delta Ps1$ in the Rankin start-up control at the time of the next start-up of the Rankine cycle 2. However, the invention is not limited thereto. For example, as illustrated in FIG. 8, when the repetition of the Rankine start-up control occurs, the valve-closing determination value (set value) $\Delta Ps1$ in the Rankine start-up control at the time of the next start-up of the Rankine cycle 2 is subjected to increase correction (considerably or up to near the upper limit value), and thereafter, when repetition of the Rankine start-up control does not occur (that is, the start-up failure does not occur), the valve-closing determination value $\Delta Ps1$ subjected to the increase correction may be reduced for each start-up of the Rankine cycle 2. In this case, an amount of decrease in the valve-closing determination value $\Delta Ps1$ subjected to the increase correction may be constant or may be varied.

Furthermore, in the Rankine start-up control using the reduced valve-closing determination value $\Delta Ps1$, when the pressure difference $\Delta P$ after closing the bypass valve 27 does not reach the start-up completion determination value $\Delta Ps2$ within the second predetermined time (that is, start-up of the Rankine cycle 2 is not completed), the Rankine start-up control is executed again using the valve-closing determination value $\Delta Ps1$, which was used in the Rankine start-up control at the time of previous start-up of the Rankine cycle 2. Then, when the start-up of the Rankine cycle 2 is completed, the valve-closing determination value ΔPs1 is retained. When the Rankin start-up control is further repeated, the increase correction of the valve-closing correction value ΔPs1 may be performed each time the Rankine start-up control is repeated.

Other Modified Examples

The exhaust heat recovery device according to the above-described embodiment is configured to assist the engine output by the driving force of the expander 23, but the present invention is also applicable to a power regeneration type exhaust heat recovery device that rotates a generator by the driving force of the expander 23. In this case, for example, the expander, the pump, and the generator motor can be integrated by being connected with the same rotating shaft.

Furthermore, the exhaust heat recovery device according to the above-described embodiment is mounted on a vehicle, and recovers and uses exhaust heat of an engine of the vehicle, but the present invention is also applicable to an exhaust heat recovery device that recovers and uses exhaust heat from an external heat source (for example, an exhaust heat recovery device that recovers and uses factory exhaust heat, and an exhaust heat recovery device that recovers and uses exhaust heat of an engine of a construction machine).

REFERENCE SYMBOL LIST 1, 10 Exhaust heat recovery device
2, 20 Rankine cycle
3, 30 Transmission mechanism
31 Electromagnetic clutch
4 Control unit
21 Refrigerant circulating passage
22 Evaporator
23 Expander
24 Condenser
25 Pump
26 Bypass passage
27 Bypass valve
28 Pump-integrated expander
50 Engine
61, 62 Pressure sensor

The invention claimed is:

1. An exhaust heat recovery device comprising:
a Rankine cycle in which a heater configured to heat and vaporize refrigerant by exhaust heat of an external heat source, an expander configured to generate power by expanding the refrigerant passed through the heater, a condenser configured to condense the refrigerant passed through the expander, and a pump configured to send the refrigerant passed through the condenser to the heater are disposed in a circulation passage of the refrigerant;
a bypass flow passage that allows the refrigerant to circulate while bypassing the expander;
a bypass valve that opens and closes the bypass flow passage;
a pressure difference determining unit that determines a pressure difference between a high-pressure side and a low-pressure side of the Rankine cycle; and
a control unit that executes start-up control of the Rankine cycle, the start-up control actuating the pump with the bypass valve open and then closing the bypass valve,
wherein the control unit repeatedly executes the start-up control when the pressure difference after closing the bypass valve does not reach a start-up completion determination value of the Rankine cycle within a predetermined time, and
wherein the control unit changes a valve-closing condition of the bypass valve each time the start-up control is repeated.

2. The exhaust heat recovery device according to claim 1, wherein the expander and the pump in the Rankine cycle are integrally connected to each other.

3. An exhaust heat recovery device comprising:
a Rankine cycle in which a heater configured to heat and vaporize refrigerant by exhaust heat of an external heat source, an expander configured to generate power by expanding the refrigerant passed through the heater, a condenser configured to condense the refrigerant passed through the expander, and a pump configured to send the refrigerant passed through the condenser to the heater are disposed in a circulation passage of the refrigerant;
a bypass flow passage that allows the refrigerant to circulate while bypassing the expander;
a bypass valve that opens and closes the bypass flow passage;
a pressure difference determining unit that determines a pressure difference between a high-pressure side and a low-pressure side of the Rankine cycle; and
a control unit that executes start-up control of the Rankine cycle, the start-up control actuating the pump with the bypass valve open and then closing the bypass valve,
wherein the control unit repeatedly executes the start-up control when the pressure difference after closing the bypass valve does not reach a start-up completion determination value of the Rankine cycle within a predetermined time, and
wherein the control unit executes, as the start-up control, control to actuate the pump with the bypass valve open, and then to close the bypass valve when the pressure difference becomes a valve-closing determination value or more, the valve-closing determination value being less than the start-up completion determination value.

4. The exhaust heat recovery device according to claim 3, wherein the expander and the pump in the Rankine cycle are integrally connected to each other.

5. The exhaust heat recovery device according to claim 3, wherein, when the repetition of the start-up control occurs, the control unit performs the increase correction of the valve-closing determination value in the start-up control at the time of the next start-up of the Rankine cycle, and then, when the repetition of the start-up control does not occur, the control unit reduces the valve-closing determination value subjected to the increase correction, for each start-up of the Rankine cycle.

6. The exhaust heat recovery device according to claim 5, wherein, in a case in which the start-up control is executed with the reduced valve-closing determination value, which has been subjected to the increase correction, when the pressure difference after closing the bypass valve does not reach the start-up completion determination value within the predetermined time, the control unit executes the start-up control again using the valve-closing determination value, which was used in the start-up control at the time of the previous start-up of the Rankine cycle.

7. The exhaust heat recovery device according to claim 3, wherein the control unit increases the valve-closing determination value each time the start-up control is repeated.

8. The exhaust heat recovery device according to claim 7, wherein the control unit increases an amount of increase of the valve-closing determination value each time the start-up control is repeated.

9. The exhaust heat recovery device according to claim 7, wherein the control unit stores the valve-closing determination value when the pressure difference after closing the bypass valve reaches the start-up completion determination value within the predetermined time, and sets the stored valve-closing determination value as an initial value of the valve-closing determination value in the start-up control at the time of the next start-up of the Rankine cycle.

10. An exhaust heat recovery device comprising:

a Rankine cycle in which a heater configured to heat and vaporize refrigerant by exhaust heat of an external heat source, an expander configured to generate power by expanding the refrigerant passed through the heater, a condenser configured to condense the refrigerant passed through the expander, and a pump configured to send the refrigerant passed through the condenser to the heater are disposed in a circulation passage of the refrigerant;

a bypass flow passage that allows the refrigerant to circulate while bypassing the expander;

a bypass valve that opens and closes the bypass flow passage;

a pressure difference determining unit that determines a pressure difference between a high-pressure side and a low-pressure side of the Rankine cycle; and a control unit that, when starting up the Rankine cycle, executes control to actuate the pump with the bypass valve open, and then to close the bypass valve when the pressure difference becomes a predetermined value, wherein the control unit executes control to open the bypass valve when the pressure difference does not reach a start-up completion determination value greater than a first predetermined value within a predetermined time after closing the bypass valve when the pressure difference becomes the first predetermined value, and then to close the bypass valve when the pressure difference becomes a second predetermined value greater than the first predetermined value and less than the start-up completion determination value.

11. The exhaust heat recovery device according to claim 10, wherein the expander and the pump in the Rankine cycle are integrally connected to each other.

* * * * *